(12) United States Patent
Hahm et al.

(10) Patent No.: US 7,400,882 B2
(45) Date of Patent: *Jul. 15, 2008

(54) METHOD FOR PROVIDING A SUBSCRIBER-BASED RINGBACK TONE SOUND STORED IN A MOBILE EXCHANGER

(75) Inventors: Hee Hyeok Hahm, Seoul (KR); Ki Mun Kim, Incheon-si (KR); Sang Yun Lee, Seongnam (KR); Yeong Tae No, Seoul (KR); Jae Young Park, Sungnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 127 days.

This patent is subject to a terminal disclaimer.

(21) Appl. No.: 10/530,020

(22) PCT Filed: Aug. 22, 2003

(86) PCT No.: PCT/KR03/01703

§ 371 (c)(1),
(2), (4) Date: Nov. 10, 2005

(87) PCT Pub. No.: WO2004/032460

PCT Pub. Date: Apr. 15, 2004

(65) Prior Publication Data

US 2006/0109968 A1 May 25, 2006

(30) Foreign Application Priority Data

Oct. 1, 2002 (KR) .................. 10-2002-0059951

(51) Int. Cl.
*H04Q 7/38* (2006.01)
(52) U.S. Cl. .............. 455/414.1; 455/567; 455/433; 455/432.3; 379/373.03; 379/207.16

(58) Field of Classification Search .............. 455/433, 455/414.1–414.3, 432.3; 379/257, 207.16, 379/372–374.3
See application file for complete search history.

(56) References Cited

U.S. PATENT DOCUMENTS

| 5,926,537 | A | 7/1999 | Birze |
| 6,427,076 | B2 * | 7/2002 | Skog .......................... 455/433 |
| 7,242,756 | B2 * | 7/2007 | Hahm et al. ........... 379/207.16 |
| 2004/0204146 | A1 * | 10/2004 | Deeds ........................ 455/567 |

FOREIGN PATENT DOCUMENTS

JP 2000-50347 2/2000

(Continued)

OTHER PUBLICATIONS

International Search Report dated Mar. 22, 2004 for PCT/KR2003/001703.

*Primary Examiner*—George Eng
*Assistant Examiner*—Marcos L Torres
(74) *Attorney, Agent, or Firm*—Lowe Hauptman Ham & Berner LLP

(57) ABSTRACT

In a method of providing a caller with a pre-stored sound chosen by a called subscriber instead of a standard RBT (RingBack Tone), an HLR (Home Location Register), when a location request message is received from a call-originating exchanger, furnishes either the call-originating exchanger or a call-terminating exchanger with information on whether or not an RBT is to be replaced for the called terminal. The call-originating exchanger or the call-terminating exchanger then searches, while a trunk connection is established between the exchangers, for a sound code assigned to the called terminal based on the information furnished by the HLR, and provides the caller with a pre-stored RBT-replacing sound associated with the found sound code as an RBT.

15 Claims, 7 Drawing Sheets

FOREIGN PATENT DOCUMENTS

| | | |
|---|---|---|
| JP | 2001-106685 | 4/2000 |
| KR | 2000-000244 | 1/2000 |
| KR | 2000-30035 | 6/2000 |
| KR | 2000-55316 | 9/2000 |
| KR | 10-0292089 * | 6/2001 |
| KR | 2001-108937 | 12/2001 |
| KR | 2002-39501 | 5/2002 |
| WO | 2000-42763 | 8/2000 |

* cited by examiner

FIG. 7

| Subscriber's Number | Sound Code |
|---|---|
| ⋮ | ⋮ |
| 293-XXXX | 07 |
| ⋮ | ⋮ |
| 294-0000 | 17 |
| ⋮ | ⋮ |

*changed* → 07

FIG. 8

| Sound Code | Sound |
|---|---|
| 01 | Sound#1 |
| ⋮ | ⋮ |
| 07 | Sound#7 |
| ⋮ | ⋮ |
| 17 | Sound#17 |
| ⋮ | ⋮ |

METHOD FOR PROVIDING A SUBSCRIBER-BASED RINGBACK TONE SOUND STORED IN A MOBILE EXCHANGER

CROSS REFERENCE TO RELATED APPLICATION

This application is the National Phase application of International Application No. PCT/KR2003/001703, filed Aug. 22, 2003, which designates the United States and was published in English. This application, in its entirety, is incorporated herein by reference.

1. Technical Field

The present invention relates to a method for providing an arbitrary sound chosen by a called subscriber, stored in an exchanger, for a calling subscriber instead of a conventional RBT (RingBack Tone).

2. Background Art

When a subscriber calls another through a mobile communication network, a terminating exchanger on the network provides the caller with a uniform ringback tone.

Since the ringback tone is same all the time, a caller can not identify a called before the called answers. Furthermore, the uniform ringback tone can not satisfy various subscribers' needs to reveal their personality.

By the way, various ad methods are being proposed in these days. One of these ad methods is to send an ad sound message to a caller instead of a conventional ringback tone. However, such an ad sound message is chosen unilaterally by a network operating enterprise. If a caller heard such a unilateral ad sound he or she could talk over a mobile telephone with a called for a limited time.

However, the method that an ad sound is provided instead of a conventional ringback tone still has the aforementioned drawbacks. That is, a caller can not identify a called before the called answers and the uniform ringback tone can not satisfy various subscribers' needs to reveal their personality.

DISCLOSURE OF INVENTION

It is an object of the present invention to provide an RBT replacing method in which an arbitrary RBT-replacing sound chosen or registered by a subscriber is stored in a mobile exchanger, and if a certain subscriber is called, an RBT-replacing sound that is assigned to the called in the exchanger is directly provided for a caller.

A method of providing an arbitrary sound stored in a mobile exchanger as an RBT (RingBack Tone) in a communication network is characterized in that it comprises: a first step, conducted by an HLR (Home Location Register), of furnishing a call-originating exchanger with information on whether or not an RBT is to be replaced for a terminal through a response message to a location request message received from the call-originating exchanger that sends the location request message to the HLR when a call connection is requested to the terminal; and a second step, conducted by the call-originating exchanger, of searching for a sound code assigned to the terminal based on the information included in the response message, and providing a caller with a pre-stored RBT-replacing sound associated with the found sound code as an RBT while making a trunk connection to a call-terminating exchanger based on the response message.

Another method of providing an arbitrary sound stored in a mobile exchanger as an RBT in a communication network is characterized in that it comprises: a first step, conducted by an HLR when allocation request message is received from a call-originating exchanger because of call connection request to a terminal, of furnishing a call-terminating exchanger with information on whether or not an RBT is to be replaced for the terminal through a routing information request message that is sent to the call-terminating exchanger; and a second step, conducted by the call-terminating exchanger when a trunk connection request from a call-originating exchanger is recognized, of searching for a sound code assigned to the terminal based on the information, and providing a caller with a pre-stored RBT-replacing sound associated with the found sound code as an RBT.

In the above methods, it is further characterized in that a server separated from an exchanger has a subscriber-code table where subscriber numbers are associated with sound codes individually, and the exchanger searches for a sound code for a called subscriber through communication with the server based on internet protocol.

The above-characterized method provides a personal ad way by allowing a registered personal introducing or identifying sound to be used instead of a uniform RBT. In addition, a caller is able to know by only hearing an RBT-replacing sound whether he or she called rightly. An enterprise as well as individual persons can advertise efficiently through registering an RBT-replacing sound.

BRIEF DESCRIPTION OF DRAWINGS

In the drawings:

FIG. 1 is a simplified diagram of an embodiment of a mobile communication network which a subscriber-based RBT-replacing sound providing method is embedded in;

FIG. 7 illustrates an RBT service table structured in a sound storager managing server in accordance with the present invention; and FIG. 8 illustrates a sound list structured in a mobile exchanger that links each RBT-replacing sound to its sound code in accordance with the present invention.

MODES FOR CARRYING OUT THE INVENTION

In order that the invention may be fully understood, preferred embodiments thereof will now be described with reference to the accompanying drawings.

Figure 1:
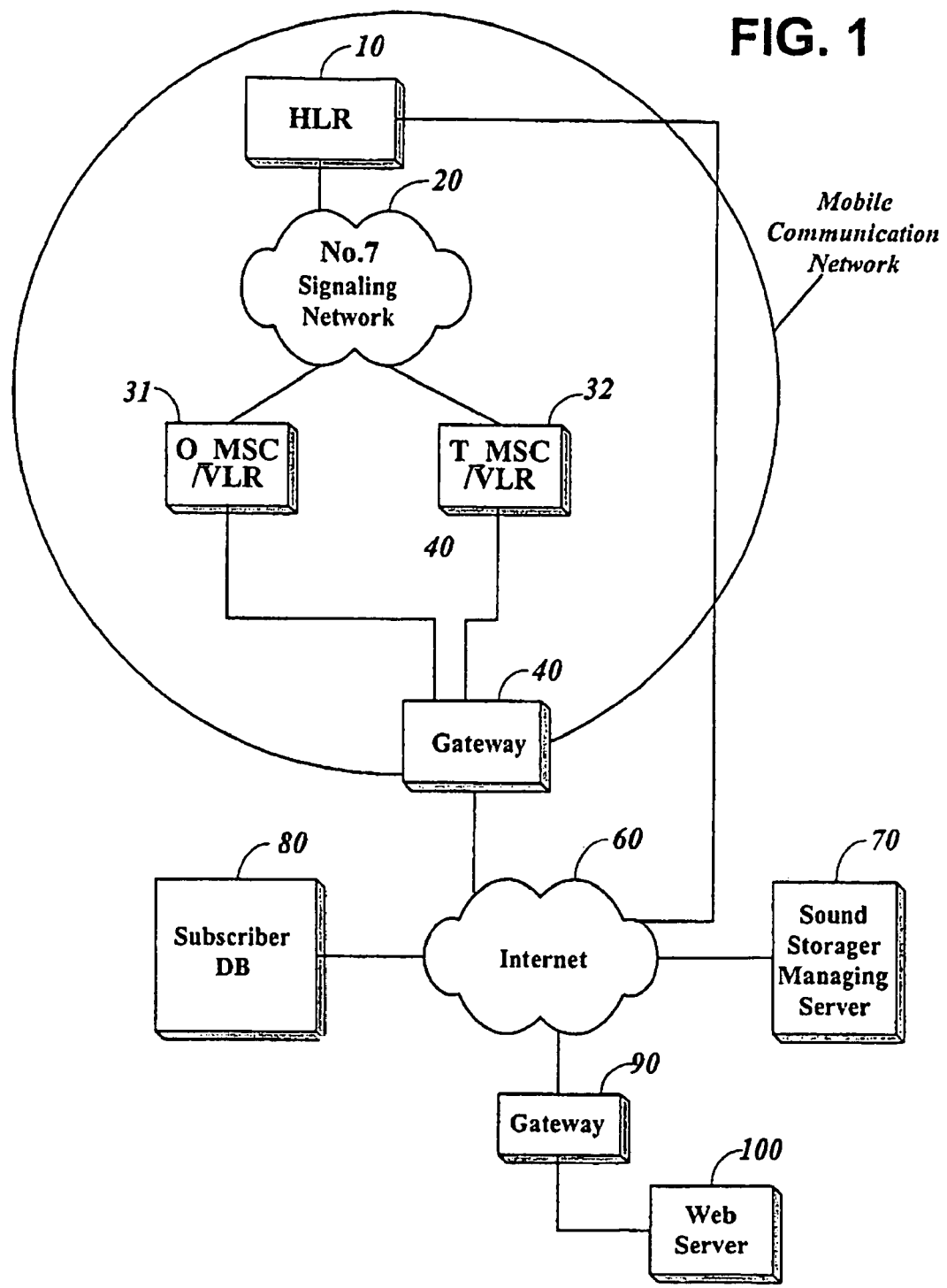

FIG. 1 is a simplified diagram of a mobile communication network which a subscriber-based RBT-replacing sound providing method is embedded in.

The network of FIG. 1 includes an HLR (Home Location Register) 10; mobile exchangers 31 and 32 (also called 'MSC' (Mobile Switching Center)), connected to Internet 60 through a gateway 40, being capable of communicating with the HLR 10 via a No. 7 signaling network 20 based on No. 7 signaling transfer protocol and storing tone-replacing sounds individually; an SSMS (Sound Storager Managing Server)

70, connected to the exchangers 31 and 32 via Internet 60, storing identifications, e.g., telephone numbers of subscribers of RBT replacement service in connection with allocated sound codes, and managing to provide RBT-replacing sounds in the exchangers 31 and 32; a subscriber db 80 connected to the HLR 10 via Internet 60; and a web server 100, connected to Internet 60 via a gateway 90, communicating with the SSMS 70.

Preferable embodiments of a subscriber-based RBT-replacing sound providing method are explained below in detail along with accompanying operations of the network of FIG. 1.

Figure 2:
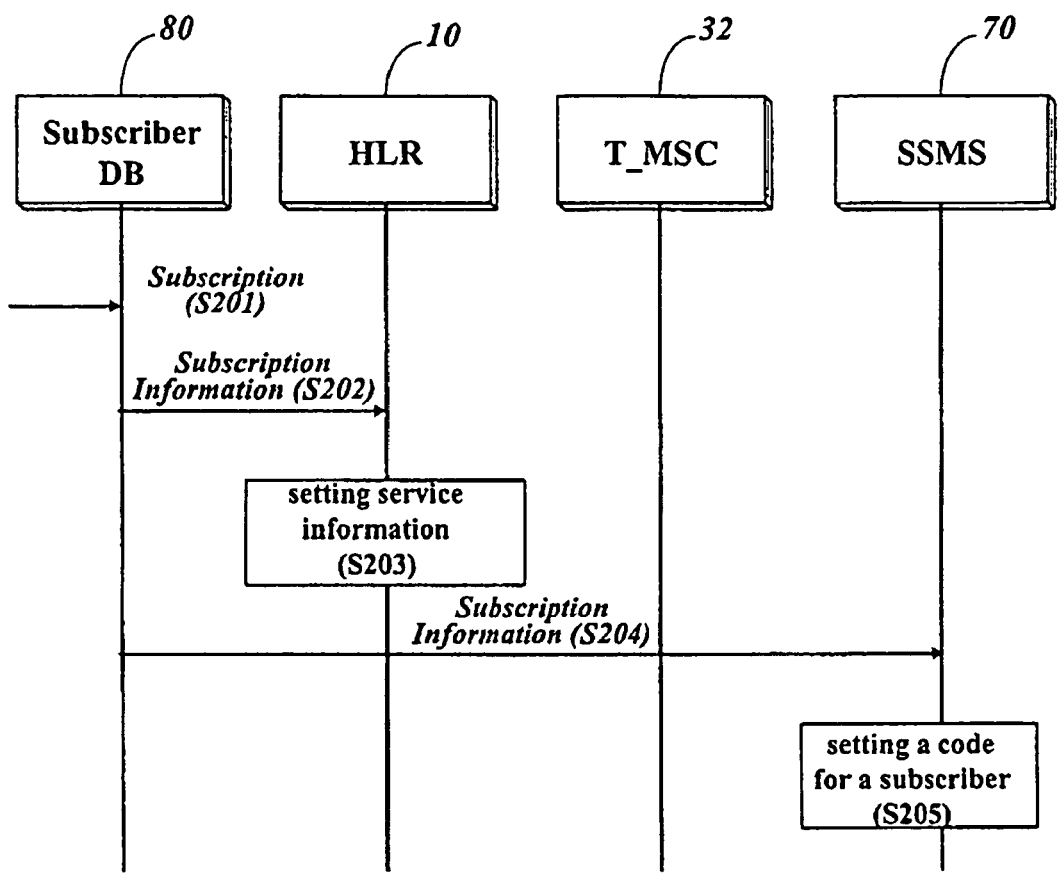
FIG. 2 is a procedure chart to subscribe to a subscriber-based RBT-replacing sound providing service in accordance with the present invention.

FIG. 2 is a procedure chart to subscribe to a subscriber-based RBT-replacing sound providing service in accordance with the present invention.

If subscription to the RBT-replacement service is asked (S201), subscription information including mobile telephone number of the subscriber is stored in the subscriber db 80 first and is then delivered to the HLR 10 (S202). The HLR 10 updates service information of the subscriber profile to indicate that the subscriber has subscribed to RBT replacement service (S203).

In addition, the subscriber db 80 also sends the subscription information including a chosen digital sound and mobile telephone number to the SSMS 70 (S204). The SSMS 70 writes a code associated with the chosen digital sound in an RBT service table allocated for that mobile telephone number (S205). After several subscriptions to RBT replacement service as above, the RBT service table is illustratively constructed as FIG. 7. In the table of FIG. 7, a sound code '07' is initially assigned to a subscriber of '293-XXXX' and another sound code '17' to another subscriber of '294-0000'.

If the received subscription information includes particulars of sound assignments, namely if the received subscription information assigns different digital sounds for each caller, each caller group, and/or each time zone, the SSMS 70 writes different codes of the respective digital sounds in each condition field of the RBT service table, at the step S205.

Figure 3:
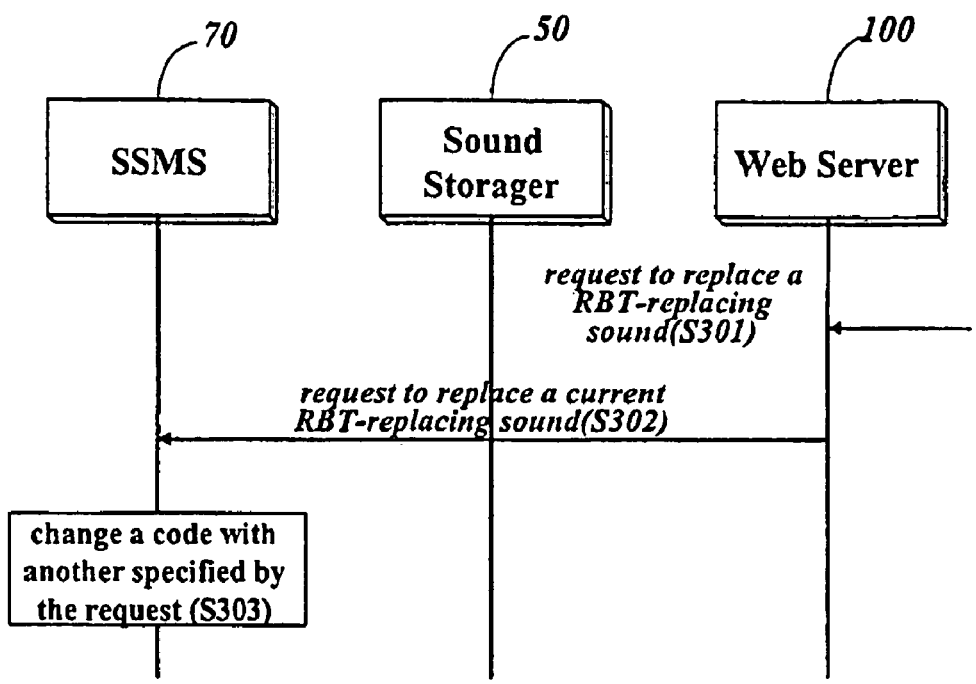
FIG. 3 is a procedure chart to change subscription information related with RST-replacing sound providing service in accordance with the present invention.

FIG. 3 is a procedure chart to change subscription information related with RBT-replacing sound providing service in accordance with the present invention.

A subscriber, who has subscribed to the RBT replacement service according to the above-explained procedure of FIG. 2, connects his or her personal computer to the web server 100, first. Then, the web server 100 provides web pages on the connected computer screen to enable the subscriber to change information about RBT replacement service.

The subscriber enters mobile telephone number, e.g., '294-0000' through an adequate web page and then selects a desired RBT-replacing sound, e.g., sound#7 from a sound list, which is illustrated in FIG. 8, showing all or a part of sounds #1 to #N with their codes stored in each of the exchangers 31 and 32. If the subscriber requests change of RBT-replacing sound to the chosen one, namely sound#7 (S301), the web server 100 sends a change-requesting message to the SSMS 70 (S302). The SSMS 70 changes the current code '17' with another code '07' assigned to the chosen sound#7 in an RBT service table allocated for the entered subscriber number '294-0000' (S303), as shown in FIG. 7. Afterwards, the RBT-replacing sound 'sound#7' identified by the changed code '07' will be provided instead of a conventional RBT.

Figure 4:
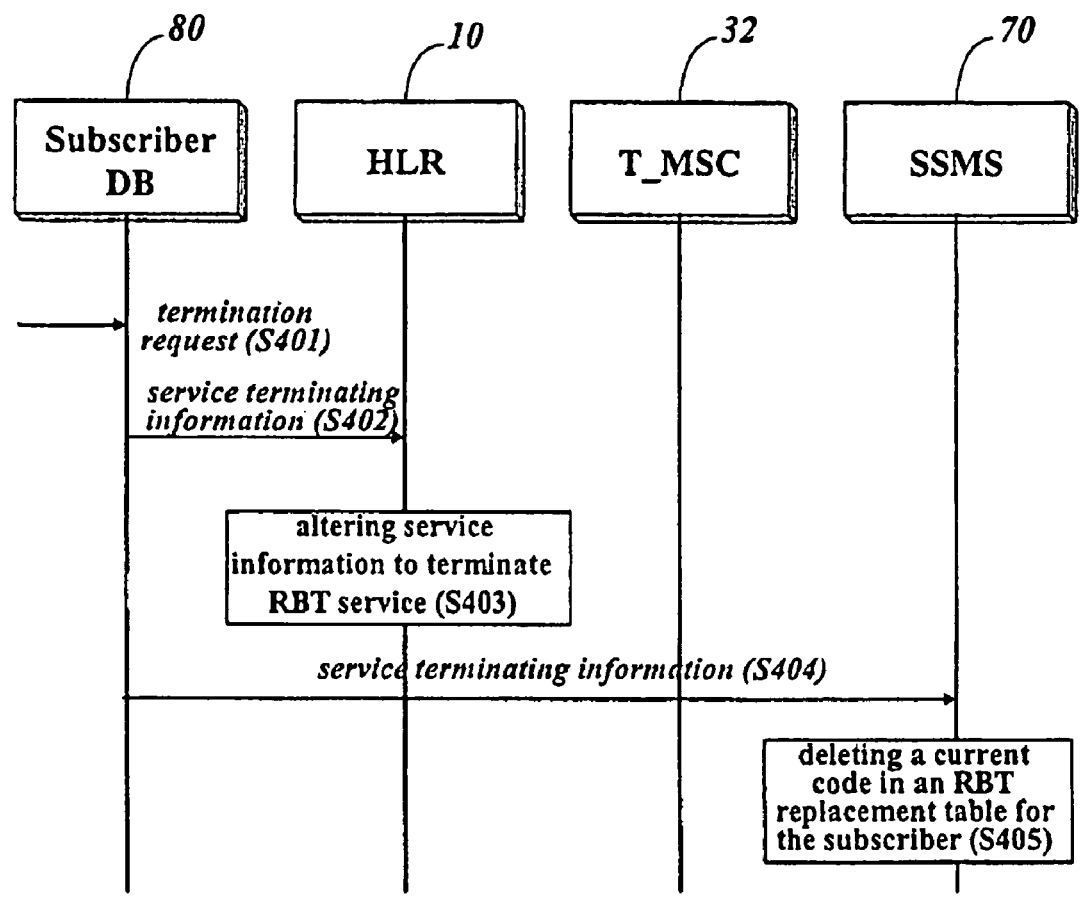
FIG. 4 is a procedure chart to terminate a subscriber-based RBT-replacing sound providing service in accordance with the present invention.

FIG. 4 is a procedure chart to terminate a subscriber-based RBT-replacing sound providing service in accordance with the present invention.

If termination of RBT replacement service is asked from a subscriber (S401), the subscriber db 80 deletes subscription information for RBT replacement service associated with the subscriber, namely, the subscriber's telephone number, and sends service terminating information including a mobile telephone number to the HLR 10 (S402). The HLR 10 alters service information of the subscriber's profile to indicate that the subscriber has not subscribed to RBT replacement service (S403).

The subscriber db 80 also sends the service terminating information to the SSMS 70 (S404), then the SSMS 70 deletes a current code in an RBT service table for the subscriber based on the received service terminating information (S405). For instance, if the subscriber's telephone number included in the service terminating information is '293-XXXX', the SSMS 70 deletes the sound code '07' associated with the number '293-XXXX' in the service table constructed as FIG. 7.

Figure 5:
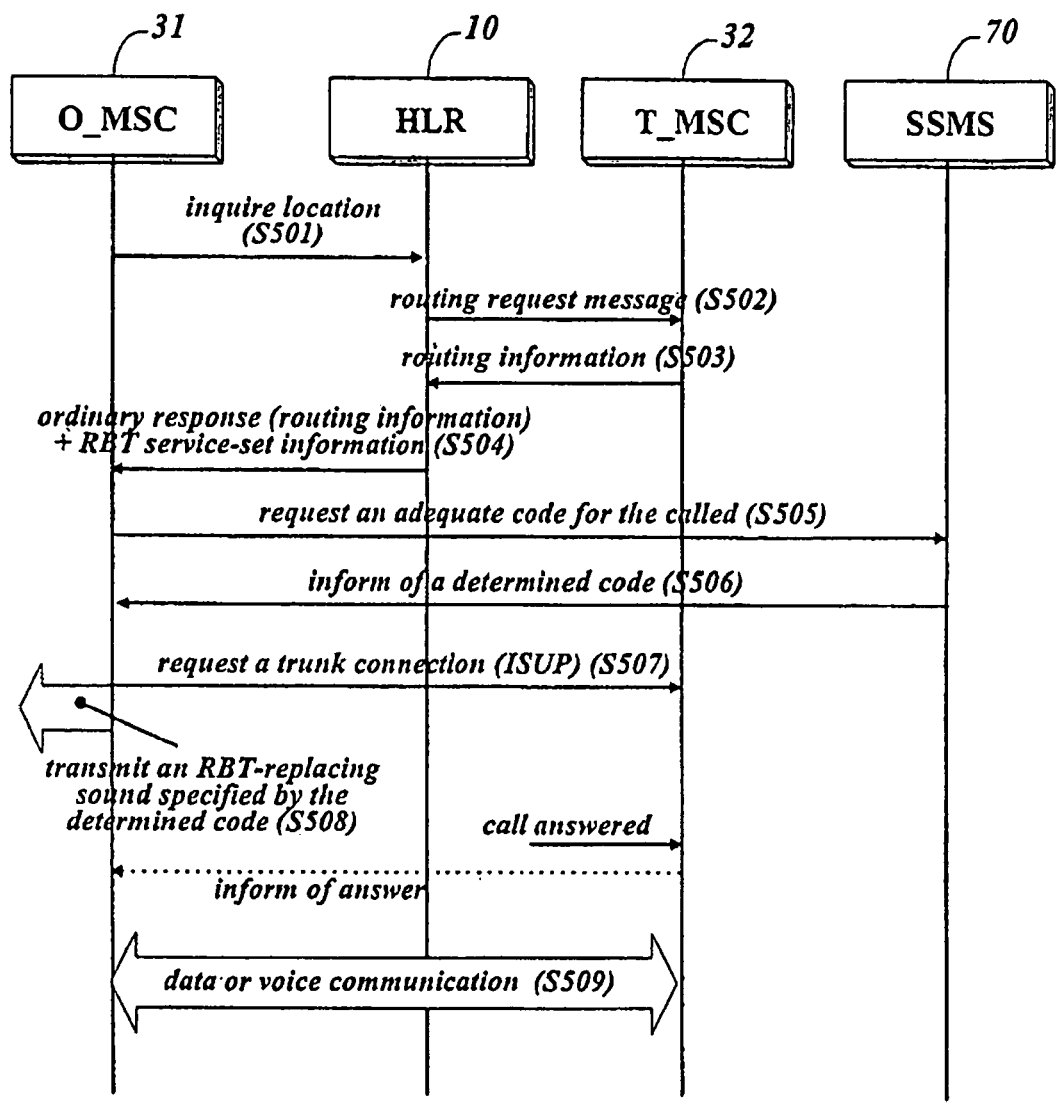
FIG. 5 is a procedure chart of an embodiment to conduct a subscriber-based RBT-replacing sound providing service in accordance with the present invention.

FIG. 5 is a procedure chart of an embodiment to conduct a subscriber-based RBT-replacing sound providing service in accordance with the present invention after completion of the procedure of FIG. 2 and/or FIG. 3.

In this embodiment, an originating exchanger provides a caller with an RBT-replacing sound stored in its db that is specified by a called subscriber.

If an arbitrary subscriber within a service zone of the exchanger 31 calls another subscriber, e.g., '293-XXXX', who has subscribed to the RBT replacement service, within the exchanger 32, the originating exchanger 31 sends a location request message to the HLR 10 to inquire where the called is (S501).

Then, the HLR 10 sends a routing request message to the terminating exchanger 32 (S502), and the terminating exchanger 32 informs the HLR 10 of routing information, e.g., TLDN (Temporary Local Directory Number) directed to itself in response to the routing request step S502 (S503).

The HLR 10 delivers the routing information received at the step S503 from the terminating exchanger 32 to the originating exchanger 31 through a response message to the inquiry step S501 (S504). The response message includes RBT service-set information for the called as well as protocol-based ordinary information.

While providing the called number, e.g., '293-XXXX', the originating exchanger 31 asks an adequate code for the number to the SSMS 70 based on the received RBT service-set information included in the response message (S505). According to the request of the step S505, the SSMS 70 searches the RBT service table structured as FIG. 7 for the called number to determine a code, e.g., '07', and informs the originating exchanger 31 of the determined code '07' (S506) in response to the code-requesting step S505.

Then, the originating exchanger 31 requests a trunk connection (called 'ISUP') to the terminating exchanger 32 (S507) based on the received routing information TLDN included in the response message received at the step S504. At the same time, the originating exchanger 31 searches the sound list on its db, structured illustratively as FIG. 8, for the determined code '07' and transmits the sound 'sound#7' associated with the code '07', to the caller as an RBT (S508). During transmission of the RBT-replacing sound, the trunk path between the originating exchanger 31 and the terminating one 32 is under control of the originating one 31.

If the called answers the call from the terminating exchanger 32 while the determined sound 'sound#7' is being transmitted instead of a conventional RBT, the originating exchanger 31 that is informed of such an answer by the terminating exchanger 32 stops transmission of the determined sound, and makes voice or data be communicated between the caller and the called through the trunk path to the terminating exchanger 32 (S509).

Figure 6:
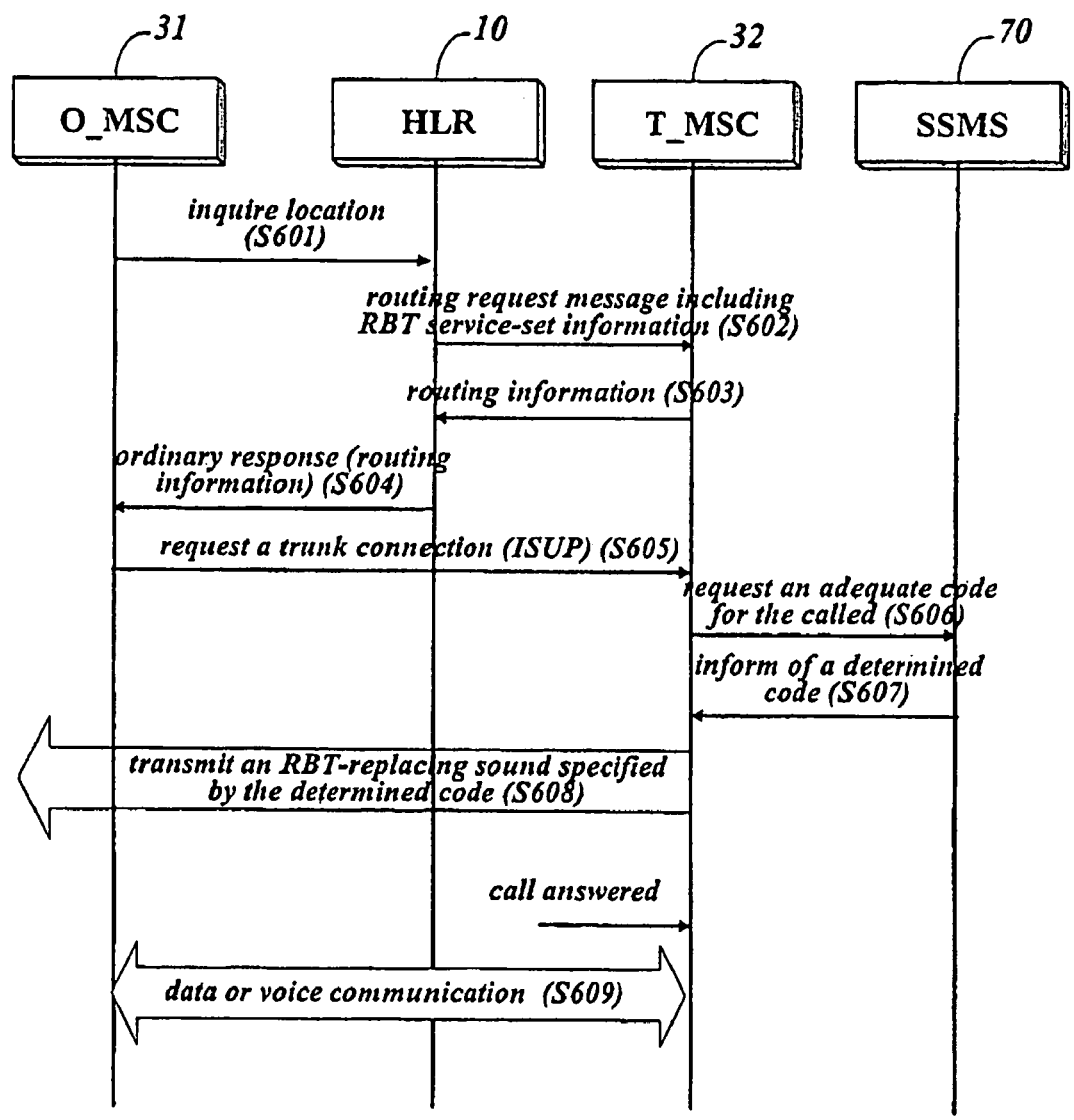
FIG. 6 is a procedure chart of another embodiment to conduct a subscriber-based RBT-replacing sound providing service in accordance with the present invention.

FIG. 6 is a procedure chart of another embodiment to conduct a subscriber-based RBT-replacing sound providing service in accordance with the present invention after completion of the procedure of FIG. 2 and/or FIG. 3.

In this embodiment, a terminating exchanger provides a caller with an RBT-replacing sound stored in its db that is specified by a called.

If an arbitrary subscriber within a service zone of the exchanger 31 calls another subscriber, e.g., '293-XXXX', who has subscribed to the RBT replacement service, within the exchanger 32, the originating exchanger 31 sends a location request message to the HLR 10 to inquire where the called is (S601).

Then, the HLR 10 sends a routing information request message to the terminating exchanger 32. Especially, the routing information request message includes RBT service-set information for the called as well as protocol-based ordinary information (S602). The terminating exchanger 32 informs the HLR 10 of routing information, namely, TLDN directed to itself in response to the routing request step S602 (S603).

The HLR 10 delivers the routing information received at the step S603 from the terminating exchanger 32 to the originating exchanger 31 in response to the inquiry step S601 (S604). Then, the originating exchanger 31 requests a trunk connection (called 'ISUP') to the terminating exchanger 32 (S605) based on the routing information TLDN received at the step S604.

Being connected with the originating exchanger 31, the terminating exchanger 32 asks an adequate code for the called number '293-XXXX' to the SSMS 70 based on the RBT service-set information received at the step S602 while providing the SSMS 70 with the number (S606). The SSMS 70 searches the RBT service table structured as FIG. 7 for the called number to determine a code, e.g., '07', and informs the terminating exchanger 32 of the determined code '07' (S607) in response to the code-requesting step S606.

The terminating exchanger 32 searches the sound list on its db, structured illustratively as FIG. 8, for the code '07', that was received at the step S607, and transmits the sound 'sound#7' associated with the code '07' to the caller as an RBT (S608).

If the called answers the call from the terminating exchanger 32 while the determined sound 'sound#7' is being transmitted instead of a conventional RBT, the terminating exchanger 32 stops transmission of the determined sound, and makes voice or data be communicated between the caller and the called through the trunk connection to the originating exchanger 31 (S609).

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

The invention claimed is:

1. A method of providing a predetermined sound as an RBT (RingBack Tone) in a communication network, said method comprising:

an HLR (Home Location Register) furnishing a call-originating exchanger with information on whether or not an RBT is to be replaced for a called terminal through a response message to a location request message received from the call-originating exchanger that sends the location request message to the HLR when a call connection is requested by a caller to the called terminal;

the call-originating exchanger searching for a sound code assigned to the called terminal based on the information included in the response message; and the call-originating exchanger providing the caller with a pre-stored RBT-replacing sound associated with the found sound code as an RBT while requesting a trunk connection to a call-terminating exchanger associated with the called terminal based on the response message.

2. A method of providing a predetermined sound as an RBT (RingBack Tone) in a communication network, said method comprising:

an HLR (Home Location Register), in response to a location request message received from a call-originating exchanger when a call connection is requested by a caller to a called terminal, furnishing a call-terminating exchanger associated with the called terminal with information on whether or not an RBT is to be replaced for the called terminal through a routing information request message that is sent by the HLR to the call-terminating exchanger;

the call-terminating exchanger, in response to a trunk connection request from the call-originating exchanger, searching for a sound code assigned to the called terminal based on the information; and the call-terminating exchanger providing the caller, via the call-originating exchanger, with a pre-stored RBT-replacing sound associated with the found sound code as an RBT.

3. The method of claim 1, wherein a server separated from the call-originating exchanger and the call-terminating exchanger has a subscriber-code table where subscriber numbers are associated with sound codes individually, and the call-originating exchanger searches for the sound code with the aid of the server.

4. The method of claim 3, wherein the call-originating exchanger communicates with the server based on an internet protocol in the code searching operation.

5. The method of claim 2, wherein a server separated from the call-originating exchanger and the call-terminating exchanger has a subscriber-code table where subscriber numbers are associated with sound codes individually, and the call-originating exchanger searches for the sound code with the aid of the server.

6. The method of claim 5, wherein the call-terminating exchanger communicates with the server based on an internet protocol in the code searching operation.

7. The method of claim 1, further comprising
locally storing a plurality of RBT-replacing sounds in a database of the call-originating exchanger; and
the call-originating exchanger searching among the RBT-replacing sounds stored in the database for the RBT-replacing sound associated with the found sound code and providing the found RBT-replacing sound to the caller.

8. The method of claim 1, wherein the response message returned from the HLR to the call-originating exchanger includes not only said information but also routing information furnished by the call-terminating exchanger.

9. The method of claim 2, further comprising
locally storing a plurality of RBT-replacing sounds in a database of the call-terminating exchanger; and
the call-terminating exchanger searching among the RBT-replacing sounds stored in the database for the RBT-replacing sound associated with the found sound code and providing the found RBT-replacing sound to the caller via the call-originating exchanger.

10. The method of claim 2, further comprising
the HLR maintaining, for each subscriber, a profile that includes information on whether or not an RBT is to be replaced for the subscriber when called.

11. A method of providing a caller with a pre-stored sound chosen by a called subscriber instead of a standard RBT (RingBack Tone), said method comprising:
- an HLR (Home Location Register), in response to a location request message received from a call-originating exchanger associated with the caller, furnishing one of (1) a call-terminating exchanger associated with the called subscriber and (2) the call-originating exchanger with information on whether or not an RBT is to be replaced for the called subscriber;
- said one of the call-originating and call-terminating exchangers then searching for a sound code assigned to the called terminal based on the information furnished by the HLR;
- said one of the call-originating and call-terminating exchangers subsequently providing the caller with an RBT-replacing sound, which is pre-stored locally at said one of the call-originating and call-terminating exchangers and associated with the found sound code, as an RBT; and
- the HLR maintaining, for each subscriber, a profile that includes information on whether or not an RBT is to be replaced for the subscriber when called;

wherein
said one of the call-originating and call-terminating exchangers is the call-originating exchanger.

12. The method of claim 11, wherein
said information is returned from the HLR to the call-originating exchanger in a response message which also includes routing information furnished by the call-terminating exchanger.

13. The method of claim 12, further comprising
the call-originating exchanger requesting the call-terminating exchanger to establish a trunk connection;
wherein the call-originating exchanger searches for the sound code before requesting the call-terminating exchanger to establish a trunk connection.

14. The method of claim 13, wherein
the call-originating exchanger receives the found sound code before requesting the call-terminating exchanger to establish a trunk connection.

15. The method of claim 14, wherein
the call-originating exchanger requests the call-terminating exchanger to establish a trunk connection and provides the caller with the RBT-replacing sound at the same time.

* * * * *